(12) United States Patent
Duerksen et al.

(10) Patent No.: US 11,593,088 B2
(45) Date of Patent: Feb. 28, 2023

(54) FIRMWARE UPDATE OF COMPONENTS OF A MODULAR NODE

(71) Applicant: WAGO Verwaltungsgesellschaft mbH, Minden (DE)

(72) Inventors: Marcus Duerksen, Herford (DE); Jonathan Jansen, Minden (DE); Juergen Gorka, Minden (DE); Mariusz Czarnecki, Herford (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 110 days.

(21) Appl. No.: 16/932,302

(22) Filed: Jul. 17, 2020

(65) Prior Publication Data
US 2021/0019137 A1 Jan. 21, 2021

(30) Foreign Application Priority Data

Jul. 17, 2019 (DE) ............... 10 2019 119 354.0

(51) Int. Cl.
*G06F 9/44* (2018.01)
*G06F 8/65* (2018.01)
*G06F 8/71* (2018.01)
*G06F 21/73* (2013.01)

(52) U.S. Cl.
CPC .............. *G06F 8/65* (2013.01); *G06F 8/71* (2013.01); *G06F 21/73* (2013.01)

(58) Field of Classification Search
None
See application file for complete search history.

(56) References Cited

U.S. PATENT DOCUMENTS

| 7,424,327 | B2 * | 9/2008 | Grgic | G05B 19/042 |
| | | | | 700/9 |
| 2009/0282399 | A1 | 11/2009 | Kamrowski | |
| 2016/0132538 | A1 * | 5/2016 | Bliss | G06F 16/20 |
| | | | | 707/741 |
| 2016/0246276 | A1 * | 8/2016 | Rischar | G05B 19/0426 |

(Continued)

FOREIGN PATENT DOCUMENTS

DE 10 2017 208 831 A1 11/2018
EP 1 688 840 A2 8/2006

OTHER PUBLICATIONS

Kamil Jezek et al., "Software Components Compatibility Verification Based on Static Byte-Code Analysis", Sep. 2013 (Year: 2013).*

*Primary Examiner* — Wei Y Zhen
*Assistant Examiner* — Lanny N Ung
(74) *Attorney, Agent, or Firm* — Muncy, Geissler, Olds & Lowe, P.C.

(57) ABSTRACT

A procedure for changing, in particular for updating, a firmware of a head station of a modular node, having a transfer of a compatibility verification routine stored on the head station from the head station on which a first firmware is stored in a nonvolatile manner to a computer connected to the head station, a verification using the verification routine executed on the computer as to whether a second firmware is compatible with the head station, and a replacement of the first firmware on the head station by the second firmware if the verification has the result that the second firmware is compatible with the head station, and also a suitably equipped head station.

11 Claims, 3 Drawing Sheets

(56) References Cited

U.S. PATENT DOCUMENTS

| | | | | |
|---|---|---|---|---|
| 2016/0371442 | A1* | 12/2016 | Haeuser | G16H 40/40 |
| 2018/0101377 | A1* | 4/2018 | Wingate, Jr. | B64D 43/00 |
| 2018/0359144 | A1* | 12/2018 | Malaspina | H04L 67/34 |
| 2019/0278588 | A1* | 9/2019 | Miyake | G06F 8/71 |
| 2020/0092137 | A1 | 3/2020 | Jerolm | |

* cited by examiner

FIRMWARE UPDATE OF COMPONENTS OF A MODULAR NODE

This nonprovisional application claims priority under 35 U.S.C. § 119(a) to German Patent Application No. 10 2019 119 354.0, which was filed in Germany on Jul. 17, 2019, and which is herein incorporated by reference.

BACKGROUND OF THE INVENTION

Field of the Invention

The present invention relates to a modular node. In particular, the present invention relates to a head station of a modular node that has one or more input/output modules, I/O modules, stacked on the head station, and/or is implemented as a field bus node.

Description of the Background Art

When a manufacturer of components of a system provides firmware updates, they must be transferred to the relevant components of the system in order to be able to replace the previous firmware there. In this process, it is necessary to ensure that the new firmware is compatible with the application environment, and in particular with the relevant components.

In this context, it is proposed in EP 1 688 840 B1, which corresponds to U.S. Pat. No. 7,424,327, that a head station extracts compatibility information from a firmware file transferred to the head station and matches it to the application environment. If incompatibility is determined, the head station refuses to perform the update and returns an appropriate error message.

SUMMARY OF THE INVENTION

It is therefore an object of the present invention to improve the state of the art.

In an exemplary embodiment, a method according to the invention includes a transfer of a compatibility verification routine stored on a head station from the head station on which a first firmware is stored in a nonvolatile manner to a computer connected to the head station, a verification using the verification routine executed on the computer as to whether a second firmware is compatible with the head station, and a replacement of the first firmware on the head station by the second firmware if the verification has the result that the second firmware is compatible with the head station.

Consequently, the verification of the compatibility of the firmware does not take place on the head station, but rather on the computer, and it is nevertheless ensured that the verification is accomplished through a routine provided for the purpose.

Here, the term "head station," can be understood to mean a component of a modular node that has the task of making available (e.g., through a field bus to which the head station is connected) the data and/or services of the I/O modules stacked on the head station. Furthermore, the term "transfer," can be understood to mean, for example, a transmission of data by means of electrical signals from the head station (sender) to the computer (receiver) over a wired (e.g., LAN) or a wireless transmission link (e.g., WLAN). In this context, the term "computer," can be understood to mean, for example, a commercially available PC (desktop) or a commercially available mobile device (laptop, tablet, smartphone, etc.) that has an interface for receiving data and has a processor equipped to process the instructions of the verification routine and, at least in the case of an incompatibility, to refuse a replacement and/or to notify the user of the incompatibility.

Furthermore, the term "compatibility verification routine," can be understood to mean, for example, an instruction sequence executable by a processor that determines whether the second firmware is compatible with the hardware of the head station. For example, the "compatibility verification routine" can determine whether the hardware configuration of the head station corresponds to a hardware configuration that is specified as compatible by the second firmware. Moreover, the "compatibility verification routine" can also verify the compatibility of the second firmware with (the firmware of) the modules stacked on the head station. For example, the second firmware can include an updated protocol for operation of the local bus (i.e., the bus that connects the modules to the head station). Consequently, in order to preserve the interoperability of the head station and the modules, the compatibility verification routine can ensure, if applicable, that a coordinated updating of the components is initiated, for example an updating of the head station and the stacked modules that is simultaneous (or takes place in a specific sequence).

Furthermore, the term "firmware," can be understood to mean, in particular, a set of instruction sequences stored in a nonvolatile memory of the head station (and if applicable of the modules), whose execution the user can adapt to an application scenario through a parameter set, but which the user cannot alter as such, and instead can only replace with other instruction sequences. In this context, the term "replace," can be understood to mean, for example, the partial or complete overwriting of a set of instruction sequences by other instruction sequences. In addition, the term "firmware," can be understood to mean, for example, instruction sequences tailored to the hardware of the head station (and if applicable of the modules), which is to say instruction sequences whose execution changes the state of the hardware (of the head station or the modules) directly (which is to say without intermediate software).

In addition, the term "compatible," can describe, in particular, a firmware whose execution produces no errors and does not (substantially) limit the functional scope of the head station or of the field bus node.

Using the verification routine executed on the computer, the method can additionally verify whether the second firmware is compatible with all I/O modules stacked on the head station, and can output a warning on the computer if the result of the verification is that the second firmware is not compatible with all I/O modules stacked on the head station.

For example, the warning can serve to notify the user that the firmware of one, several, or all I/O modules must also be updated in order to be able to continue using the modular node.

The modular node links field devices connected to the I/O modules can be connected to a field bus by means of a local bus controlled by the head station.

Here, the term "local bus," can be understood to mean, for example, a bus through which (only) the I/O modules stacked on the head station are connected (in signaling terms) to one another and to the head station. In this context, the term "field devices," as used within the scope of the present description and the claims, should be understood to mean, in particular, sensors and/or actuators connected (in signaling terms) to the I/O modules (for example, attached to the I/O modules).

The replacement of the first firmware on the head station by the second firmware can also includes a replacement of the verification routine.

For example, the new verification routine can accept as compatible more, or different, firmware versions (than the first verification routine), or take aspects into account during the verification that the replaced verification routine did not take into account.

The method can additionally have a request by the verification routine executed on the computer for first data from the head station, in particular a serial number, from which a hardware version of the head station can be derived, and a comparison of the first data with second data with regard to the second firmware, wherein the second data specify what hardware version the second firmware is compatible with.

The method can additionally have a request by the verification routine executed on the computer for third data from the head station with which it is possible to determine an updating program stored on the head station, and comparison of the third data with fourth data, wherein the fourth data specify what firmware can be installed by the updating program stored on the head station.

The method can additionally have a replacement of the updating program with an updating program that can install the second firmware on the head station if the comparison of the third data with the fourth data has the result that the second firmware cannot be installed by the updating program on the head station.

The replacement of the updating program can be accomplished, for example, through a replacement of the first firmware on the head station (by a third firmware, for example).

The compatibility verification routine can be executed in a browser of the computer. For example, the compatibility verification routine (or components of the compatibility verification routine) can be written in HTML and/or JavaScript.

A head station according to the invention can, for example, include an HTTP server that is equipped to transfer a compatibility verification routine stored on the head station from the head station, on which a first firmware is stored in a nonvolatile manner, to a computer connected to the head station, and to initiate a replacement of the first firmware by the second firmware in response to the reception of data that represent a second firmware.

It is a matter of course in this regard that the head station according to the invention can be equipped to execute (steps of) the method according to the invention, and the method according to the invention can be implemented using the head station according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
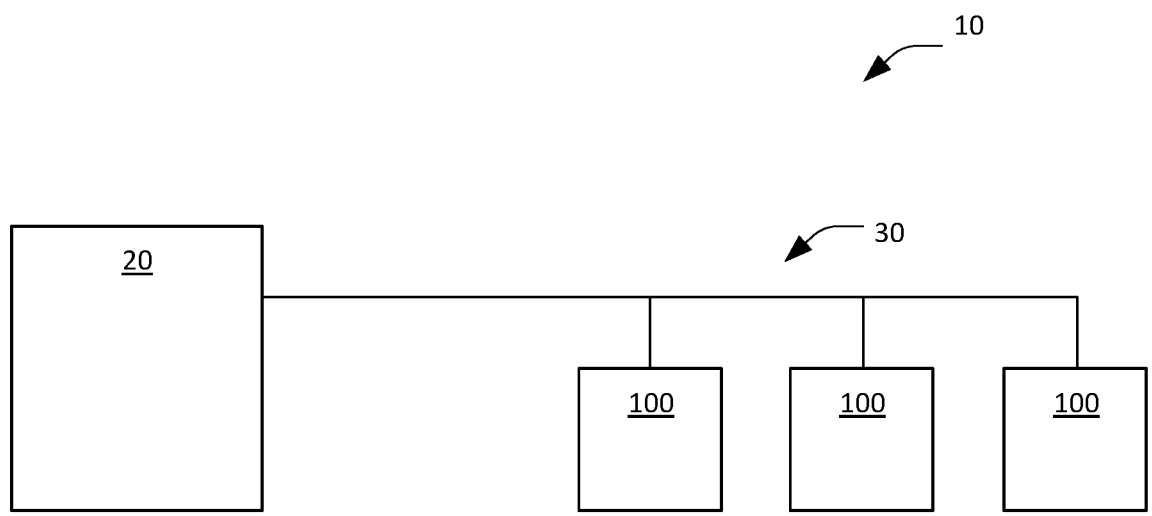
FIG. 1 illustrates a field bus system.

FIG. 1 shows a block diagram of a field bus system 10. The field bus system 10 includes a higher-level control unit 20, to which a plurality of modular field bus nodes 100 are connected through a field bus 30. The higher-level control unit 20 can serve to both monitor and regulate an installation (not shown) that is controlled through the field bus system 10. If the higher-level control unit 20 monitors an installation, the higher-level control unit 20 can cyclically or acyclically receive status data describing the state of the installation from the field bus node 100, and can generate an error signal or an alarm signal when the state of the installation deviates (substantially) from a desired/permitted state or state range. If the higher-level control unit 20 (not only monitors, but also) regulates the installation, the higher-level control unit 20 can also cyclically or acyclically receive status data from the field bus node 100 and, taking the status data into account, can determine control data that are transferred to the field bus node 100.

Figure 2:
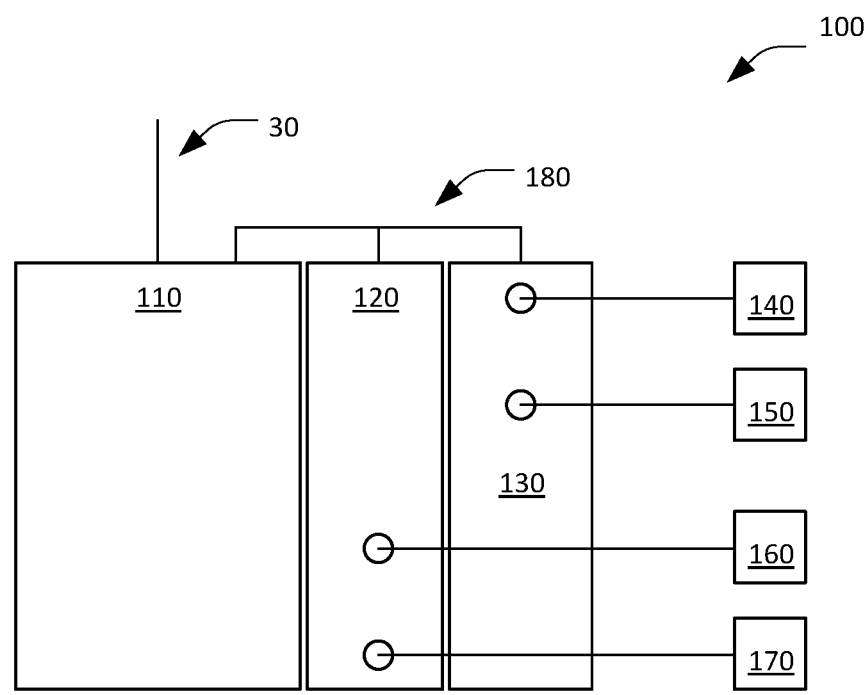
FIG. 2 illustrates a field bus node and field bus devices connected to the field bus node.

FIG. 2 shows an exemplary modular field bus node 100 formed of a head station 110 and, stacked on the head station 110, two I/O modules 120, 130 to which are connected field devices 140, 150, 160, 170, such as, e.g., sensors and actuators. During operation, the I/O modules 120, 130 read in sensor signals through the inputs, and from the sensor signals create status data that are transferred to the head station 110 through the local bus 180. The head station 110 can process the status data locally and/or forward it (possibly in modified form) to the higher-level control unit 20. The higher-level control unit 20 (or, in the case of local processing, the head station 110) can then create control data while taking the status data into account.

The control data created by the higher-level control unit 20 can then be transferred through the field bus 30 to (the same or) a (different) head station 110. The control data transferred to the head station 110 (or created by the head station 110) are then forwarded/transferred (possibly in modified form) to the I/O modules 120, 130. The I/O modules 120, 130 receive the control data and issue control signals corresponding to the control data at the outputs to which the actuators are connected. The communication of data between the components of the field bus system 10 and the mapping of sensor signals onto status data and the mapping of control data onto control signals can be adapted here to different application scenarios through a configuration of the field bus node 100.

To this end, some or all components of the field bus system 10 are provided with a firmware that makes it possible to receive and to store a configuration data set and to carry out the processing of signals/data while taking the configuration data set into account. The possibility of adaptation is thus limited to changes that can be achieved through a modified configuration data set, however, whereas more extensive changes require a replacement of the firmware of the components of the field bus system 10. The purpose of such a replacement can be, e.g., to correct defects or generally to improve the firmware, so that an update (upgrade) of the firmware is associated with the replacement. Of course, the opposite path is also possible, in which a firmware is replaced by an earlier version, for example because an updated version is not available for all components of the field bus system 10 and, for example, components with an updated firmware version and components with a non-updated version cannot interoperate (or can only interoperate with limitations).

Figure 3:
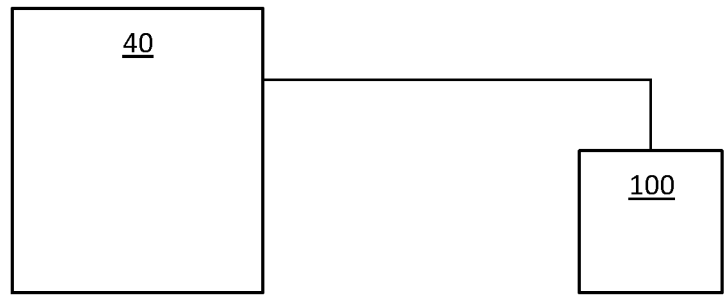
FIG. 3 illustrates a field bus node and a computer connected to the field bus node.
Figure 4:
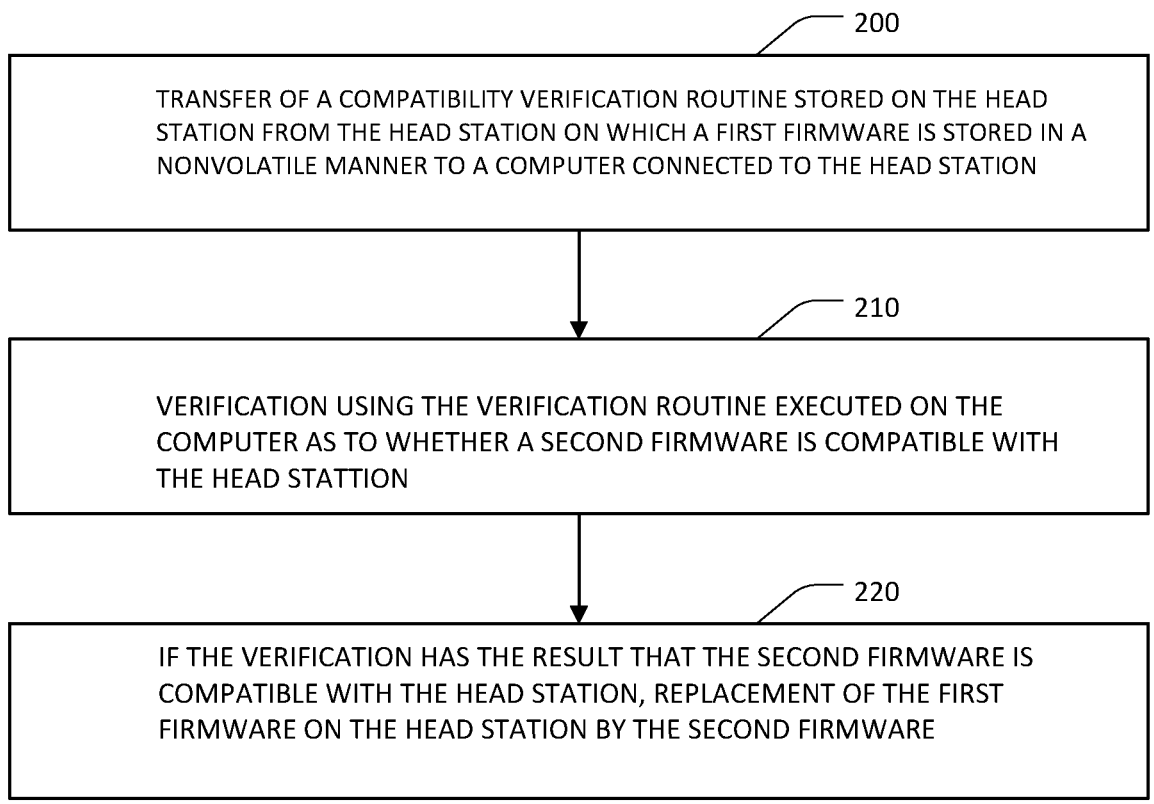
FIG. 4 illustrates a flowchart of a process for updating a head station.

The replacement of the firmware of the head station 110 involves, as illustrated in FIG. 3, a computer 40 connected to the head station 110. The computer 40 connected to the head station 110 in this context can be a computer 40 that is connected (temporarily) to the head station 110 specifically for the update (e.g., through a TCP connection), or a computer 40 that is (permanently) part of the field bus system 10, such as the higher-level control unit 20, for example. In order to execute a replacement routine, the computer 40 can establish a connection to the head station 110 and request a compatibility verification routine that is stored on the head station 110. As shown in FIG. 4, the head station 110 can transfer the compatibility verification routine to the computer 40 connected to the head station 110 in response to the request in step 200.

Figure 5:
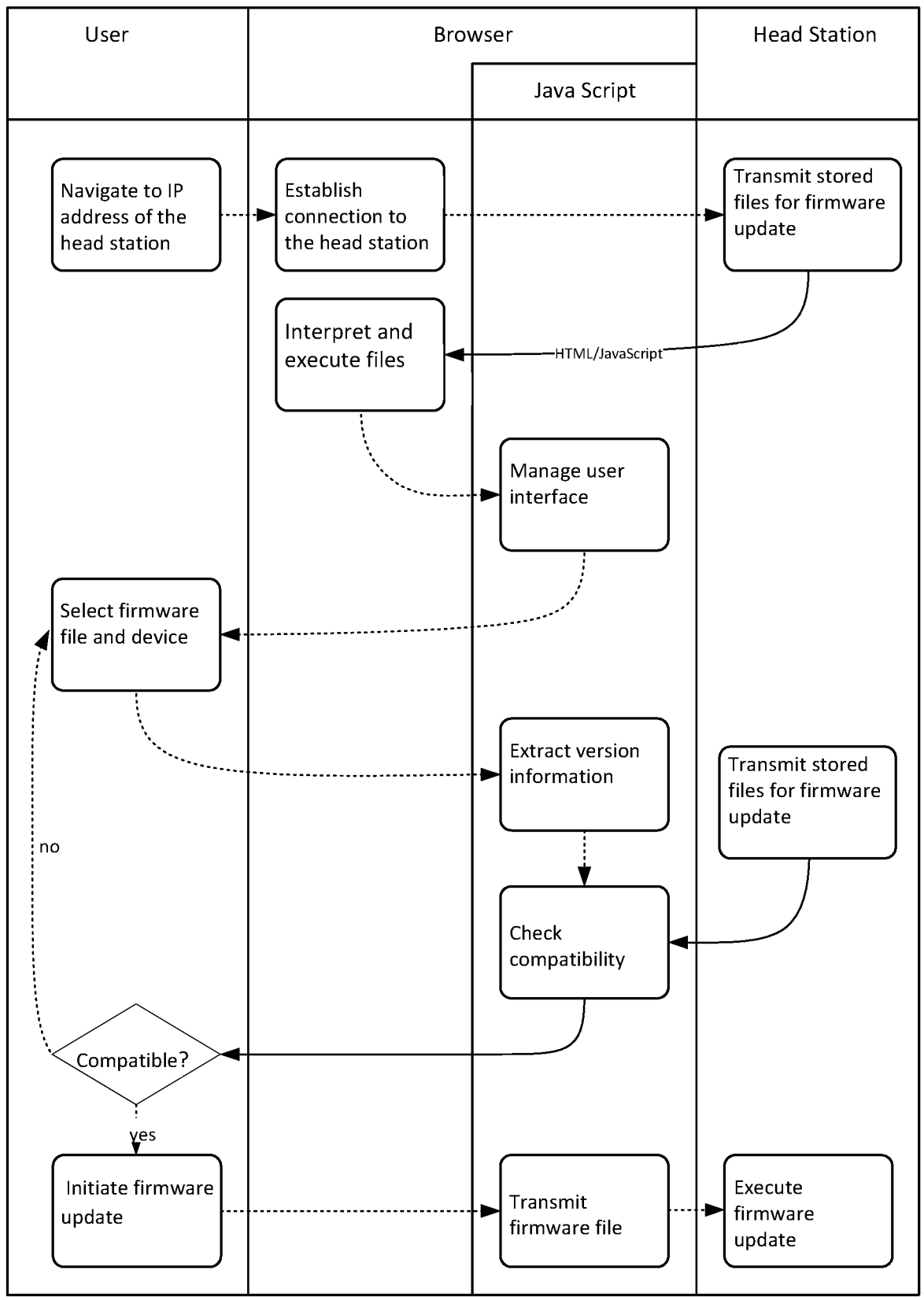
FIG. 5 illustrates a flowchart of a process for a firmware update.

As shown in FIG. 5, the computer 40 can be provided with a browser with which a user of the computer 40 can navigate to the IP address of the head station 110, wherein the HTTP server of the head station 110 permits a transfer of files (for example, files in HTML and/or JavaScript) that are stored for the firmware update. Said files can be interpreted and executed in the browser of the head station 110, causing a user interface to be provided to the user, by means of which he/she can control the firmware update. In this process, if the I/O modules 120, 130 likewise have a firmware that can be updated through the head station 110, the user can be given the ability to select the device or devices to be updated (which is to say the head station 110 and/or one or more of the I/O modules 120, 130 stacked on the head station) and to associate a firmware file (which has been provided by a manufacturer of the relevant device and downloaded through the Internet to the computer 40, for example) with each selected device.

In contrast, if the I/O modules 120, 130 have no firmware or have a firmware that cannot be updated through the head station 110, provision can also be made that the user only needs to select one firmware file (which is then automatically associated with the head station 110 for lack of alternatives). Once the information concerning the firmware version has been extracted from the associated firmware file or files and a file stored on the head station 110 that includes information concerning the hardware of the head station 110 and/or the hardware of the I/O modules 120, 130 has been evaluated, the verification routine executed in the browser (for example, a JavaScript program) can verify according to step 210 from FIG. 4 whether the firmware version is compatible with the hardware of the head station 110 or with the hardware of the I/O module or modules 120, 130. For example, the file stored on the head station 110 can include one or more serial numbers from which a hardware version of the head station 110 and/or of the I/O modules 120, 130 can be derived.

If the verification has the result that the firmware is compatible with the head station 110, then the firmware on the head station 110 can be replaced by another firmware, as shown in step 220 in FIG. 4. In this case, the firmware update can be initiated by the user, as shown in FIG. 5, if the verification has the result that the firmware and the hardware are compatible with one another. When the user initiates the firmware update, the firmware file is transferred from the computer 40 to the head station 110 and is installed there by an updating program. The replacement of the firmware on the head station by the second firmware can also include a replacement of the verification routine. In other words, the files stored on the head station 110 that were transferred to the computer 40 and executed in the browser of the computer 40 can be overwritten as part of replacement of the firmware.

Likewise, the updating program stored on the head station 110 can also be replaced as part of the firmware update. As a result, firmware updates can be carried out incrementally, for example in two (or more) steps. For example, it may be the case that the target firmware is compatible but cannot be processed by the current firmware or by the updating program currently stored on the head station 10. In this case it may be necessary to carry out one or more firmware updates before the target firmware can be installed. It may likewise be the case that the target firmware is compatible but cannot be processed by the verification routine currently stored on the head station 10. In this case it may likewise be necessary to carry out one or more firmware updates before the target firmware can be allowed by the verification routine.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for changing and/or updating a firmware of a head station of a modular node, the method comprising:
    transferring a compatibility verification routine stored on the head station from the head station on which a first firmware is stored in a nonvolatile memory, to a computer connected to the head station;
    verifying, using the compatibility verification routine executed on the computer, as to whether a second firmware is compatible with the head station;
    replacing the first firmware on the head station by the second firmware if the verification has a result that the second firmware is compatible with the head station;
    requesting, by the compatibility verification routine executed on the computer, for first data from the head station from which a hardware version of the head station is derived;
    comparing the first data with second data with regard to the second firmware, wherein the second data specifies what hardware version the second firmware is compatible with;
    executing a request by the compatibility verification routine on the computer for third data from the head station to determine an updating program stored on the head station; and
    comparing the third data with fourth data, wherein the fourth data specifies what firmware can be installed by the updating program stored on the head station.

2. The method according to claim 1, wherein the modular node has one or more input/output modules (I/O modules) stacked on the head station, and/or is implemented as a field bus node.

3. The method according to claim 2, further comprising:
    verifying using the compatibility verification routine executed on the computer as to whether the second firmware is compatible with all of the one or more I/O modules stacked on the head station; and if a result of the verification is that the second firmware is not compatible with all of the one or more I/O modules stacked on the head station, outputting a warning on the computer.

4. The method according to claim 2, wherein the modular node links field devices connected to the one or more I/O modules to a field bus via a local bus controlled by the head station.

5. The method according to claim 1, wherein the replacement of the first firmware on the head station by the second firmware includes a replacement of the compatibility verification routine.

6. The method according to claim 1, further comprising:
replacing the updating program with a different updating program that installs the second firmware on the head station if the comparison of the third data with the fourth data has a result that the second firmware cannot be installed by the updating program on the head station.

7. The method according to claim 6, wherein the replacement of the updating program with the different updating program is accomplished through a replacement of the first firmware on the head station by a third firmware.

8. The method according to claim 1, wherein the compatibility verification routine is executed in a browser of the computer.

9. The method according to claim 8, wherein the compatibility verification routine is written in Hypertext Markup Language (HTML) or JavaScript.

10. The method according to claim 1, wherein the first data is a serial number of the hardware version of the head station.

11. A head station comprising:
an Hypertext Transfer Protocol (HTTP) server; and
a non-volatile memory on which a compatibility verification routine and a first firmware is stored,
wherein the HTTP server is configured to transfer the compatibility verification routine from the head station to a computer connected to the head station, and is configured to receive data that represent a second firmware from the computer and initiate a replacement of the first firmware with the second firmware,
wherein the HTTP server is configured to replace the compatibility verification routine when the first firmware on the head station is replaced by the second firmware,
wherein the HTTP server is configured to transfer first data, from which a hardware version of the head station is derived, from the heat station to the computer upon request by the compatibility verification routine executed on the computer, the first data being coparted compared with second data with regard to the second firmware, wherein the second data specifies what hardware version the second firmware is compatible with; and
wherein the HTTP server is configured to transfer third data from the head station to the computer to determine an updating program stored on the head station upon request by the compatibility routine executed on the computer, the third data being compared with fourth data, wherein the fourth data specifies what firmware can be installed by the updating program stored on the head station.

* * * * *